(12) United States Patent
Olbert et al.

(10) Patent No.: US 10,974,964 B2
(45) Date of Patent: Apr. 13, 2021

(54) MODULAR CATALYST MONOLITHS

(71) Applicant: BASF SE, Ludwigshafen am Rhein (DE)

(72) Inventors: Gerhard Olbert, Ludwigshafen am Rhein (DE); Jochen Gauer, Ludwigshafen (DE); Holger Friedrich, Ludwigshafen am Rhein (DE); Andreas Spiegel, Ludwigshafen am Rhein (DE); Andreas Wölfert, Ludwigshafen am Rhein (DE); Wolfgang Gmeiner, Ludwigshafen am Rhein (DE); Michael Lorenz, Ludwigshafen am Rhein (DE)

(73) Assignee: BASF SE

( * ) Notice: Subject to any disclaimer, the term of this patent is extended or adjusted under 35 U.S.C. 154(b) by 143 days.

(21) Appl. No.: 15/779,347

(22) PCT Filed: Nov. 18, 2016

(86) PCT No.: PCT/EP2016/078100
§ 371 (c)(1),
(2) Date: May 25, 2018

(87) PCT Pub. No.: WO2017/089231
PCT Pub. Date: Jun. 1, 2017

(65) Prior Publication Data
US 2018/0305210 A1 Oct. 25, 2018

(30) Foreign Application Priority Data

Nov. 27, 2015 (EP) .................................... 15196794

(51) Int. Cl.
*C01B 21/28* (2006.01)
*B01J 19/24* (2006.01)
(Continued)

(52) U.S. Cl.
CPC ............. *C01B 21/28* (2013.01); *B01J 10/007* (2013.01); *B01J 19/2485* (2013.01); *C01B 21/26* (2013.01); *C01B 21/38* (2013.01)

(58) Field of Classification Search
CPC ......... C01B 21/28; C01B 21/26; C01B 21/38; B01J 10/007; B01J 19/2485; B01J 8/00–46
See application file for complete search history.

(56) References Cited

U.S. PATENT DOCUMENTS

| 6,743,404 B1 | 6/2004 | Schumacher et al. |
| 9,725,320 B2 | 8/2017 | Olbert et al. |

(Continued)

FOREIGN PATENT DOCUMENTS

| CN | 102186579 A | 9/2011 |
| CN | 103762372 A | 4/2014 |

(Continued)

OTHER PUBLICATIONS

International Search Report for PCT/EP2016/078100 dated Feb. 1, 2017.

(Continued)

*Primary Examiner* — Anthony J Zimmer
(74) *Attorney, Agent, or Firm* — Faegre Drinker Biddle & Reath LLP

(57) ABSTRACT

The present invention relates to a reactor R with apparatus D, the latter comprising a gas- and/or liquid-permeable tray B, in the edge region of which there is disposed a lateral boundary W which fully encloses the tray B and forms a volume V comprising catalytic and/or noncatalytic shaped bodies (F), wherein there is at least one braid made of precious metal and/or base metal on the upstream side opposite the tray B, and the catalytic and/or noncatalytic shaped bodies (F) are selected from (i) shaped bodies (F1)

(Continued)

Figure 1:
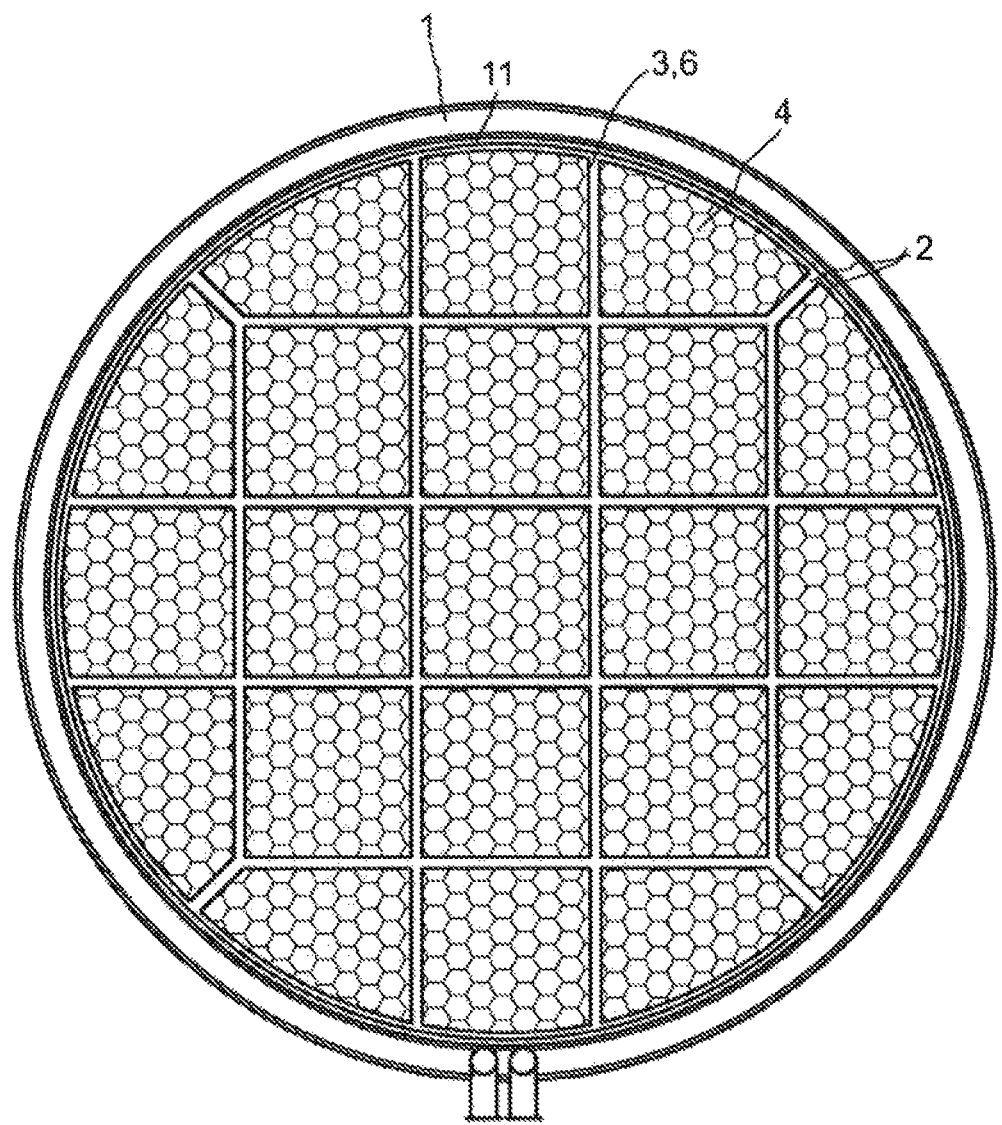

in the form of straight prisms, the footprint of which is selected from triangle, rectangle, hexagon or fragments of these polygons, and (ii) a combination of the shaped bodies (F1) with shaped bodies (F2) that are smaller than the shaped bodies (F1), wherein groups of m to n shaped bodies (F1), m and n being an integer from 3 to 30 with n>m, are framed in a metal cassette open in the upstream direction and closed in the downstream direction by a gas-permeable tray, in a virtually seamless manner with side face to side face and with their longitudinal axis aligned in vertical direction, virtually completely covering the cross section of the tray, to form modules (M), and the modules (M), optionally with cooperation of a joint filler material, with vertical alignment of the longitudinal axis of the shaped bodies (F1), are joined to one another virtually seamlessly in a mosaic-like manner.

7 Claims, 3 Drawing Sheets

(51) Int. Cl.
*C01B 21/26* (2006.01)
*B01J 10/00* (2006.01)
*C01B 21/38* (2006.01)

(56) References Cited

U.S. PATENT DOCUMENTS

2016/0200575 A1* 7/2016 Olbert ............... B01J 8/025
423/392
2018/0078922 A1 3/2018 Deuerlein et al.

FOREIGN PATENT DOCUMENTS

| DE | 19819882 A1 | 10/1999 |
| DE | 10350819 A1 | 6/2005 |
| EP | 1147813 A2 | 10/2001 |
| WO | WO-2006009453 A1 | 1/2006 |
| WO | WO-2015022247 A1 | 2/2015 |
| WO | WO-2016055452 A1 | 4/2016 |
| WO | WO-2016055453 A1 | 4/2016 |

OTHER PUBLICATIONS

Written Opinion of the International Searching Authority for PCT/EP2016/078100 dated Feb. 1, 2017.

* cited by examiner

MODULAR CATALYST MONOLITHS

CROSS-REFERENCE TO RELATED APPLICATIONS

This application is a national stage application (under 35 U.S.C. § 371) of PCT/EP2016/078100, filed Nov. 18, 2016, which claims benefit of European Application No. 15196794.0, filed Nov. 27, 2015, both of which are incorporated herein by reference in their entirety.

The present invention relates to a reactor R, preferably a high-temperature reactor, with apparatus D, to the use of the reactor R with the apparatus D, and to a process for preparing nitrogen oxides or nitric acid, in each case using the reactor R with the apparatus D, in each case as defined in the claims.

Apparatuses accommodated in reactors, for example in basketlike form, which generally consist, for construction reasons or strength reasons among others, of materials having good thermal conductivity, such as metal or metal alloys, for example steel, expand when the reactor, for example, is heated up to operating temperature or heats up as a result of heat of reaction, and contract when the reactor cools down.

When apparatuses of this kind comprise readily movable particulate charges, for example dumped charges, of cylindrical or star-shaped catalytically active or catalytically inactive particles, the differences in thermal expansion between apparatus and said charge generally result in formation of depressions—often irregular and funnel-shaped—in the edge region of the apparatus, into which the particles typically trickle or subside from the edge region of the apparatus.

This is undesirable since the inhomogeneity of the charge typically results in worsened properties, for example with regard to the catalytic characteristics thereof. This is because, for example, the flow rate of a gas in the depressions in the edge region is greater than in the regions without depression; thus, there is typically a drop in the dwell time of the gas in the edge region, where the reaction gas also has less catalytic area available, which generally leads to lower catalytic conversions in the edge region and overall.

The above-described apparatuses can also comprise, in addition to said particles or instead of said particles, monolithic shaped bodies of honeycomb shape, for example, which frequently consist of pressed, extruded and/or sintered inorganic material, which is typically brittle, friable or abrasion-sensitive. The above-described expansion and contraction of the above-described apparatus can also cause the monolithic shaped bodies to move, for example rub against one another and break up or fall over. This entails the same problems as described above for the particle charge, Moreover, it is laborious and inefficient to exchange monolithic catalytic shaped bodies of this kind for fresh shaped bodies one by one, and there is the risk of fracture of shaped bodies of this kind on extraction from or insertion into the accommodating apparatus. It is also a relatively common occurrence that the reactors, frequently as a result of erratic operation, are subject to unplanned and unwanted failure and have to be repaired, for which the monolithic catalytic shaped bodies mentioned then also have to be deinstalled in order to get to the repair site and, on completion of repair to the reactor, the shaped bodies have to be reinstalled.

The above-described disadvantages exist, for example, in processes for preparing nitrogen oxides and/or nitric acid by oxidation of ammonia in the presence of a catalyst, for example a precious metal-containing catalyst mesh. In this case, the oxidation products of ammonia are typically guided through a bed of a particulate dinitrogen monoxide breakdown catalyst and/or a bed of a dinitrogen monoxide breakdown catalyst consisting of monolithic shaped bodies, which is typically within a basketlike apparatus. For example, in this process, the abovementioned funnel-shaped depressions or else destruction or disorder of the monolithic shaped bodies in this bed of dinitrogen monoxide breakdown catalyst lead to reduced breakdown of the dinitrogen monoxide over the catalyst bed, which in turn typically entails higher dinitrogen monoxide emissions from the production plant, which are undesirable.

A structured packing (for example hexagonal or cubic) of shaped catalyst bodies (modular structured fixed-bed reactor, "MOSFIBER") for breakdown of, for example, dinitrogen monoxide ($N_2O$) in a reactor is known from WO 2006/009453 A1 (Yara International). However, WO 2006/009453 A1 is silent with regard to the problem of abrasion or fracture of the shaped catalyst bodies during the operation of the reactor and to the exchange thereof for new shaped catalyst bodies.

It was an object of the present invention to provide a reactor with apparatus, the latter comprising catalytic monolithic shaped bodies which are virtually not damaged or destroyed during the operation of the reactor and which can be completely or partly installed and/or deinstalled efficiently and virtually without damage or destruction thereof.

Accordingly, what have been found have been the reactor R, preferably a high-temperature reactor, with the apparatus D, the use of the reactor R with the apparatus D, and a process for preparing nitrogen oxides or nitric acid, each using the reactor R with the apparatus D, each as defined in the claims.

In a preferred embodiment of the invention, the reactor R with the apparatus D, in each case as described hereinafter, is used in a process for preparing nitrogen oxides and/or nitric acid. This embodiment is also referred to hereinafter as "NOx/HNO$_3$ embodiment", and the details which follow are explicitly applicable—unless explicitly stated otherwise—to the NOx/HNO$_3$ embodiment in particular.

Processes for preparing nitrogen oxides and/or nitric acid, typically by catalytic oxidation of ammonia with an oxygenous gas, generally air, are known and are described, for example, under "Nitric Acid, Nitrous Acid, and Nitrogen Oxides" in Ullmanns Encyclopedia of Industrial Chemistry, Sixth, Completely Revised Edition, volume 23, pages 1 to 49, 2003, Wiley-VCH Verlag GmbH & Co. KGaA, Weinheim.

Typically, in a process for preparing nitrogen oxides and/or nitric acid, a mixture of ammonia and an oxygenous gas, for example air or else pure oxygen, is converted at typically relatively high temperature, for example in the range from 800 to 900° C., catalytically, for example over a mesh of precious metal such as platinum or platinum/rhodium alloy, and the reaction products formed, which generally comprise nitrogen monoxide as the main component and dinitrogen monoxide ("laughing gas") as a secondary component, typically flow through a bed comprising catalytic and/or noncatalytic, typically ceramic shaped bodies that are stable to the reaction conditions in the reactor, which is arranged downstream in flow direction, typically beneath the catalyst mesh.

This bed is typically catalytically active with respect to the breakdown of dinitrogen monoxide, is typically accommodated in a basketlike apparatus, and generally degrades the dinitrogen monoxide to the elements nitrogen ($N_2$) and oxygen ($O_2$). After the reaction mixture has left the typically basketlike apparatus, it is typically cooled down in heat exchangers, wherein it reacts further with oxygen to form nitrogen dioxide. The reaction mixture is generally cooled down further by means of various heat exchangers—in the course of which nitric acid may already condense out to some degree—and ultimately the reaction mixture is reacted in an absorption apparatus with water to form nitric acid. Any dilute nitric acid that has condensed out beforehand in the cooling/condensation is typically likewise fed into the absorption apparatus.

The invention is described in detail hereinafter.

The material for the apparatus D is typically a high-temperature material made of metal, for example Inconel 600 (materials no. 2.4816), Alloy 602 CA, Haynes Alloy or else materials made of austenitic steels having materials numbers 1.4828 and 1.4835 and 1.4876. The coefficients of thermal expansion of these materials at operating temperatures of 800-900° C. are typically in the range from $17\times10^{-6}$ $K^{-1}$ to $19\times10^{-6}$ $K^{-1}$.

A material of good suitability for the apparatus D is Inconel 600 or steel having materials number 1.4835 or Alloy 602 CA or Haynes Alloy.

Preferred materials for the apparatus D are Inconel 600, steel having materials number 1.4835 or Alloy 602 CA.

The tray B of the apparatus D is generally perforated, the nature and geometry of the perforation being uncritical, and is especially permeable to gases and/or liquids, preferably to gases. The tray B is typically perforated such that the particles that it typically bears cannot fall through the perforation.

In one embodiment, the tray B comprises a support component, for example a grid composed of frames or a honeycomb construction, on which there may typically rest a metal base mesh or multiple, for example 2 to 3, metallic base meshes, typically of different mesh sizes and/or different mesh wire thicknesses. The support component, for example a grid composed of frames or a honeycomb construction, may consist of one piece, but it is also possible for multiple segments, preferably 2 to 8 segments, more preferably 4 to 6 segments, to be put together, these being readily fixable to one another, in which case the segments may have various geometries, for example quarter-circle segments, sixth-circle segments, eighth-circle segments, i.e. "piece-of-cake geometry".

The openings of the abovementioned tray meshes may be of any cross-sectional geometry, for example rectangular, hexagonal, round.

Typically, the tray B has been made from the material 1.4835, Alloy 602 CA and Inconel 600, preferably Inconel 600 or Alloy 602 CA.

The cross-sectional geometry of the tray B in principle is generally guided by the cross-sectional geometry of the reactor R in which it is typically accommodated. Preferably, the cross-sectional geometry of the tray B is the same as that of the reactor R in which the tray B is accommodated.

Useful cross-sectional geometries for the tray B and/or the reactor R in which it is accommodated include angular, preferably quadrangular or hexagonal, more preferably rectangular or regular hexagonal, cross sections.

In addition, useful cross-sectional geometries for the tray B and/or the reactor R in which it is accommodated are virtually round or elliptical cross sections, preferably virtually round or round cross sections for the tray B and/or the reactor R in which it is accommodated. More preferably, the cross section of the tray B and/or the cross section of the reactor in which it is accommodated is virtually round or round.

The tray B may be mounted in the reactor R, for example, directly or via ceramic or metallic spacers on a cooler or heat exchanger arranged downstream beneath the tray B. The tray B may also be supported by means of a middle internal stub and lateral straps that act as supports.

The material for the lateral boundary W of the apparatus D is typically the same as for the tray B.

The lateral boundary W is arranged in the edge region of the tray B such that it fully surrounds the tray B and forms a space having the volume V which is partly or completely filled with catalytic and/or noncatalytic shaped bodies—as set out in detail further down. In a particular embodiment, it is then possible for the lateral boundary to be bonded in a fixed manner to the tray B, in which case a basketlike connection is formed.

The lateral boundary W is typically arranged relative to the tray B at the angles of 45° to 135°, preferably virtually at right angles. The lateral boundary W is typically straight, i.e. virtually unbent in vertical direction.

The ratio of the height of the lateral boundary W to the clear diameter of the tray B is typically in the range from 0.04 to 0.2.

Typical heights of the lateral boundary W are in the range from 100 to 1000 mm, preferably 150 to 600 mm.

Typical clear diameters of the tray B are in the range from 2500 to 6000 mm.

The lateral boundary W may, but need not, have been manufactured from a single piece; it may also consist of individual parts or segments.

At least over part of the area of the inside of lateral boundary W, there may advantageously be a thermally insulating layer S, preferably in the region that directly adjoins the tray B on the upstream side. The thermally insulating layer S can cover the area of the inside of the lateral boundary W, for example, to an extent of 30% up to virtually 100%, preferably virtually completely.

Preferably, the thermally insulating layer S, is at least the lower 30%, for example 30% to 90%, i.e. those parts of the area of the inside of the lateral boundary W closest to the tray B.

The thermally insulating layer S generally surrounds the lateral boundary W completely on the inside thereof.

The thermally insulating layer S typically adjoins the inside of the lateral boundary W virtually directly, i.e. virtually without separation, in the direction of the center of the apparatus D. The thermally insulating layer S can assume virtually any cross-sectional geometry to the side facing the center of the apparatus D, for example on the contact side to the bed of particles or the shaped bodies, for example from straight (rectangular) to oblique, for example in the form of a trapezium, curved inward (concave) and curved outward (convex), i.e. side facing the center of the apparatus D, in stages with one or more stages.

The thermally insulating layer S may consist of one piece or may be composed of individual elements to give the desired cross-sectional geometry, as described in detail further down.

The thickness of this thermally insulating layer S based on the diameter of the tray B is typically in the range from 0.5% to 5%, for example 1.0%. For example, the thermally insulating layer S has a thickness of 50 mm with a diameter of the tray B of 2500 to 6000 mm.

The material for the thermally insulating layer S is selected from the group consisting of ceramic material, for example fireclay, microporous material and silicate fibers, where the aforementioned materials generally do not break down within the temperature range from about 700 to 1100° C. and typically have a thermal conductivity in the range from 0.03 to 0.15 W/m/K.

Preferred microporous materials are microporous silicatic substances comprising finely divided silica and opacifiers that do not break down within the temperature range from about 700 to 1100° C. and have a thermal conductivity in the range from 0.04 to 0.09 W/mK within the temperature range from 700 to 1100° C., for example WDS® High and WDS® Ultra products from Porextherm; see three-page datasheet Version 1.4/15-02 10/HH WDS® High and three-page datasheet Version 1.03/15-02 10/HH WDS® Ultra from Porextherm Dämmstoffe GmbH, Heisinger Straße 8/10, 87437 Kempten, www.porextherm.com.

The thermally insulating layer S may be formed from sheets of the aforementioned material having a thickness of, for example, 10 to 50 mm, preferably the microporous silicatic substances, where the sheets are matched to the required shapes or cross-sectional geometries of the thermally insulating layer W.

In a preferred embodiment, the aforementioned material, preferably microporous silicatic substances—preferably after they have been subjected to thermal pretreatment at 850° C.—and/or silicate fibers in the form of mats, for the thermally insulating layer S has been encased in cassettes (also referred to hereinafter as "insulation cassettes"), as described hereinafter, which can then, as described hereinafter, generally be combined to give the thermally insulating layer S.

There follows a description by way of example of an insulation cassette with encased insulation material.

The insulation cassette typically consists of a metal housing, for example made of steels of high thermal stability, which has been filled with one or more insulation materials, such as the above-described microporous material, preferably the microporous silicatic substances, and/or silicate fibers, the latter preferably in the form of mats. For example, the microporous material installed into the insulation cassettes has been spaced apart from the metal wall by silicate fiber mats and silicate fibers.

The metal housing of the insulation cassettes may consist of one or more metals, for example high-temperature materials such as Inconel 600, Alloy 602 CA, typically on the insulation cassette side facing the higher temperature, and material 1.4541 on the side of the insulation cassette facing typically the lower temperature.

These insulation cassettes preferably have a cuboidal shape, preferably with a slight curvature and folds or other overlap installations that can form a tongue and groove configuration. The walls present at the end faces of the cassettes, which typically form the fold and overlap regions of the attached cassettes, should typically be executed in a low metal thickness, for example in order to prevent the effective overall transfer of heat.

The wall thickness of the fold and overlap region of the insulation cassettes is typically in the range from 0.2 to 0.5 mm and is typically less than the wall thickness of the remaining portion of the thermal insulation cassette, which is typically in the range from 0.8 to 1.5 mm. Preferably, the fold and overlap regions of the insulation cassettes are embossed in a wavy pattern.

For example, for construction of the thermally insulating layer S, the above-described insulation cassettes are arranged like segments on the inside of the lateral boundary W over its circumference.

The insulation cassettes have preferably been equipped in circumferential direction (tangential direction) with a push fit or other overlap techniques, for example tongue and groove, and, for example, are immobile only in circumferential direction.

Typically, the insulation cassettes, at the fitting temperature, which is typically 0 to 30° C., are joined to one another such that, at the site where the insulation cassette is subjected to a higher temperature in the reactor R, the joint width is greater than at the site of lower temperature in the reactor R, the effect of which is typically that the insulation cassettes fit very coherently to one another through expansion, virtually without stress or formation of distortion, at elevated operating temperature in the reactor R.

In one embodiment, it is possible for a portion of the lateral boundary W—with or preferably without a thermally insulating layer W—called W1 here, to be firmly bonded to the tray B, to completely surround it and to be relatively small; for example W1 has a height in the range from 50 to 150 mm. The second portion of the lateral boundary W, called W2 here, may be arranged and preferably fixed at the inner reactor wall as a "skirt", for example in the form of a Z-shaped construction, so as to fully enclose it, with the end of the skirt W2 in the form, for example, of a U or V profile turned to face downward. The lateral boundary W1 projects into the opening of this upturned U or V. The firm connection of the lateral boundary W1 to the tray B is brought about, for example, by welding. The thermally insulating layer S, typically beneath any catalyst mesh present, is preferably in a two-part configuration and is preferably in a push fit configuration, where typically the upper of the two parts of the thermally insulating layer S is preferably firmly bonded to the upper lateral boundary W2 and the lower portion of the thermally insulating layer S is not firmly bonded to the upper lateral boundary W2, such that it can still move up- and downward in vertical direction. It is also possible for a thermally insulating layer S to be mounted above any catalyst mesh present, preferably covering the entire remainder of the lateral boundary W. In one variant of this embodiment, W1 may be bonded to the tray B not in a fixed manner but reversibly, in such a way that it can be detached therefrom and connected thereto again by a few manual operations, for example by screwing, inserting, welding.

In a further embodiment, the lateral boundary W fully encloses the tray B and is not firmly bonded thereto, but arranged and preferably fixed, for example, as a "skirt" at the inner reactor wall so as to fully enclose it, with a surrounding gap between the lower end of the skirt and the tray B.

Typically, cooling apparatuses, for example tubes through which there is a flow of a heat-absorbing medium—for example water or salt melt, are disposed at least in the region of the inner wall of the reactor R where the apparatus D is accommodated, between the inner wall of the reactor R and the outside of the lateral boundary W of the apparatus D, for example in that the tubes are arranged in the form of a tube coil between inner reactor wall and the outside of the lateral boundary W. Cooling apparatuses of this kind typically have the task of protecting the reactor wall from excessive heat by active cooling, at least in the region of the apparatus D and/or the reactor flange.

In one embodiment, the cooling apparatuses at the inner wall of the reactor R in the region of the apparatus D may have been replaced entirely or partly by a thermally insulating layer S as described herein.

In this case, the region of the inner wall of the reactor R where the apparatus D is accommodated itself forms the lateral boundary W, on the inside of which there is disposed at least partly, preferably fully and over the circumference with virtually no gaps, the thermally insulating layer S as described above—preferably composed of the above-described insulation cassettes—and, for example, up to a height in the range from 200 to 1200 mm, measured from the tray B upstream.

On the upstream side opposite the tray B, there is at least one braid made of precious metal, for example platinum, palladium, rhodium and/or precious metal alloys, for example comprising the aforementioned precious metals, and/or at least one braid made of base metal, for example Megapyr mesh (Kanthal mesh)—the latter typically for mechanical stabilization of the precious metal mesh. The above-described mesh made of precious metal and/or base metal is also referred to herein as "catalyst mesh".

The volume V of the apparatus D comprises catalytic and/or noncatalytic shaped bodies (F) as described hereinafter.

Noncatalytic shaped bodies (F) herein are typically ceramic shaped bodies that are stable to the reaction conditions in the reactor R and virtually do not catalyze the reactions in the reactor R.

Catalytic shaped bodies (F) herein are generally shaped bodies which catalyze one or more reactions that proceed in the reactor R, for example the breakdown of dinitrogen monoxide ($N_2O$) to give nitrogen and oxygen.

The catalytic and/or noncatalytic shaped bodies (F) are selected from (i) shaped bodies (F1) in the form of straight prisms, the footprint of which is selected from triangle, rectangle, hexagon or fragments of these polygons, and (ii) a combination of the shaped bodies (F1) with the shaped bodies (F2) that are defined hereinafter and are smaller than the shaped bodies (F1).

The footprint of the shaped bodies (F1) is that of a preferably regular triangle, a preferably regular rectangle, a preferably regular hexagon or fragments of these polygons. The parallel shift of the polygon that forms the footprint occurs perpendicularly to the footprint, so as to result in a straight prism as the geometric body. If the footprint of the straight prism is rectangular, this is also referred to as a cuboid. The parallel boundary face of the respective prism which is congruent to the footprint of the prism is called the top face; the entirety of all the other boundary faces is called the outer face.

A useful further parameter for description of the shaped bodies (F1) and especially (F2) is the "equivalent particle diameter" $Dp_{eq}$. This is defined as follows:

$$Dp_{eq} = 6 \times V_k / A_k$$

where $V_k$ is the volume of the shaped body and $A_k$ is the total outer surface area of the shaped body. By way of example, the equivalent particle diameter for a "strand", a cylindrical shaped body, as shaped body F2 having a diameter d=3 mm and a length l=10 mm is calculated as follows: it is found that $A_k$=108.4 mm² and $V_k$=70 mm³. From this it is calculated that $Dp_{eq}$=6×70.7/108.4=3.91 mm.

Preferably, $Dp_{eq}$ of the shaped bodies (F1) is five times to fifty times, preferably fifteen times to twenty-five times, as high as $Dp_{eq}$ of the shaped bodies (F2).

The height of the shaped bodies (F1) in the form of a straight prism may be equal to or less than the longest side length of the polygon with n edges that forms its footprint (n=3, 4 or 6); preferably, the height of the shaped bodies (F1) in the form of a straight prism is greater than the longer side length of the polygon with n edges that forms its footprint (n=3, 4 or 6), so as to result in a prism elongated upward with a longitudinal axis.

Fragments of the polygons with n edges (n=3, 4 or 6) that form the footprint of the shaped bodies (F1) can be formed in any desired manner, for example by cutting the triangle across its height, cutting the rectangle across its diagonal, or cutting the hexagon through two opposite corners, to form a triangle or a trapezium. This fragmentation again results in three-dimensional shaped bodies (F1) in the form of a straight prism.

The shaped bodies (F1) in the form of a straight prism generally have a diameter or diagonal of the footprint in the range from 20 to 100 mm, preferably from 50 to 75 mm, and a height in the range from 100 to 300 mm, preferably from 150 to 230 mm.

Catalytic shaped bodies (F1) as described above are typically what are called unsupported catalysts, i.e. those that need virtually no inert carrier substance. Catalytic shaped bodies (F2) of this kind that are of good suitability are those that catalyze the breakdown of dinitrogen monoxide ($N_2O$) and that are described, for example, in DE 103 50 819 A, especially in paragraphs [0015] to [0017]. They are obtainable by extrusion, for example.

Catalytic shaped bodies (F1) as described above may also be those which have a body of inert carrier material, for example cordierite, with a channel or multiple channels which run(s) virtually parallel to the longitudinal axis of the shaped body (F1), and the channel surface of which is coated with a catalytically active composition in each case. Said channels generally have square cross sections and the number of channels per unit area, expressed in cpsi (cells per square inch) is, for example, 400 with, for example, a channel width of 1.2 mm or 230 cpsi with a channel width of 1.6 mm (minus the wall thickness in each case). Catalytic shaped bodies of this kind are also referred to as "monoliths". Catalytic shaped bodies (F1) of this kind that are of good suitability are those that catalyze the breakdown of dinitrogen monoxide ($N_2O$) and that are described, for example, in EP 1 147 813 A2 or in WO 2006/009453 A1.

The catalytic and/or noncatalytic shaped bodies (F2) are smaller than the shaped bodies (F1). Preferably, $Dp_{eq}$ of the shaped bodies (F1) is 5 to 50 times, preferably 15 to 25 times, as high as $Dp_{eq}$ of the shaped bodies (F2).

The catalytic and/or noncatalytic shaped bodies (F2) are typically regularly or irregularly shaped solid particles generally having a length in the range from 3 to 30 mm and a diameter in the range from 2 to 10 mm, for example with a round or star-shaped cross section. Further catalytic and/or noncatalytic shaped bodies (F2) may be as follows: high-flow rings, rings, spheres, extrudates, hollow extrudates or further solid particles and/or shaped bodies having similar dimensions to those described above.

Catalytic shaped bodies (F2) as described above are typically what are called unsupported catalysts, i.e. those that need virtually no inert carrier substance. Catalytic shaped bodies (F2) of this kind that are of good suitability are those that catalyze the breakdown of dinitrogen monoxide ($N_2O$) and that are described, for example, in DE 103 50 819 A, especially in paragraphs [0015] to [0017].

Groups of m to n shaped bodies (F1) are framed in a metal cassette open in the upstream direction and closed in the downstream direction by a gas-permeable tray, in a virtually seamless manner with side face to side face and with their longitudinal axis (height) aligned in vertical direction, to form modules (M); m, n is an integer from 3 to 30 and n>m.

The tray of the modules (M) is generally perforated -the nature and geometry of the perforation being uncritical—and is especially permeable to gases and or liquids, preferably to gases. Typically, the tray of the modules (M) is perforated such that the particles that it bears cannot fall through the perforation.

The base area of the modules (M) is generally in the range from 0.25 to 1.5 m², preferably in the range from 0.5 to 1.0 m².

The geometry of the shaped bodies (F1) is advantageously chosen such that, when they are arranged in a virtually seamless manner with side face to side face and with their longitudinal axis (height) aligned in vertical direction, they virtually completely cover the cross section of the tray of the module (M). Typically, for this purpose, in the inner edge region of the module (M), the above-described fragments of the shaped bodies (F1) are used to fill any gaps. One example of the equipping of the modules (M) with shaped bodies (F1) and the virtually complete coverage of the cross section of the tray B of the apparatus D with the modules (M) is shown in FIG. 1.

Figure 2:
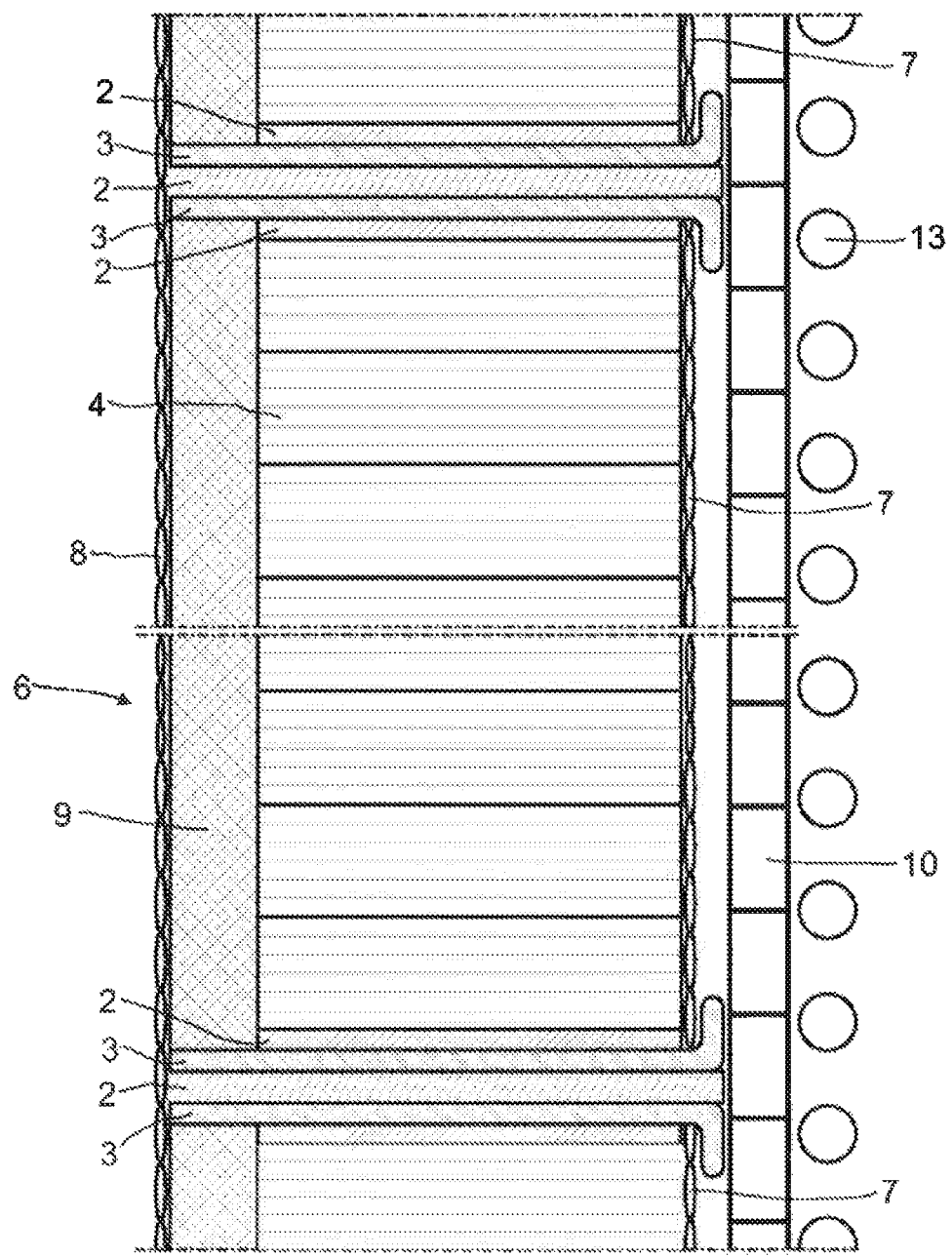

The space between the outermost shaped bodies (F1) in the module (M) and the inside of the module (M) may be filled with a joint filler material, as shown, for example, in FIG. 2. Useful joint filler materials include: weave, felt, mats or similar composed of high-temperature-resistant inorganic, preferably mineral, material such as silicate.

In the manner outlined, a layer of shaped bodies (F1) and optionally (F2) that virtually completely covers the tray of a module (M) is formed. It will be appreciated that it is possible to construct a further layer of shaped bodies (F1) and optionally (F2) or multiple further layers of shaped bodies (F1) and optionally (F2) and analogously on top of this first layer.

The walls of the module (M) consist of metal, preferably of material 1.4835, Alloy 602 CA and Inconel 600, preferably Inconel 600 or Alloy 602 CA. Advantageously, devices, for example loops, have been mounted on the cassettes that form the modules (M), preferably on the walls thereof, and these serve, for example, for easy removal of the modules (M) individually or collectively, for example by pulling them out, from the apparatus D.

The height of the walls of the cassettes that form the modules is at least as high as the length of the longest shaped bodies (F1) present therein; preferably, the height of the walls of the cassettes that form the modules is 5% to 30% higher than the greatest height of the longest shaped bodies (F1) present therein.

In a preferred embodiment, the height of the walls of the cassettes that form the modules (M) is sufficiently high that the upper edge of the walls meets the underside of the braid made of precious metal and/or base metal opposite the base B of the apparatus D on the upstream side. The volume in the module (M) unfilled by shaped bodies (F1) that has thus been created may be filled up partly or preferably completely by a gas- or liquid-permeable layer of high-temperature-resistant inorganic, preferably mineral, material such as alumina, for example foamed ceramic, Berl saddles, or noncatalytic shaped bodies (F2). Complete filling has the advantage, for example, that the braid made of precious metal and/or base metal opposite the base B of the apparatus D on the upstream side is supported over its full area and thus barely hangs down. One example of this embodiment is shown in FIG. 2.

The area geometry of the tray of a module (M) may be varied. It is advantageously chosen such that, when the modules (M) are joined to one another in a mosaic-like manner side by side, they virtually completely cover the cross section of the tray B of the apparatus D. The area geometry of the tray of a module (M) may be as follows: (a) polygonal, for example triangular, quadrangular or hexagonal, preferably quadrangular, for example rectangular, more preferably square, or else hexagonal, more preferably regularly hexagonal, or (b) polygonal, preferably irregularly polygonal, more preferably irregularly quadrangular, where one side of the polygon in each case is formed by an arc of a circle. One example of various area geometries of the tray of a module (M) and the virtually complete coverage of the cross section of the tray B of the apparatus D by the modules (M) is shown by way of example in FIG. 1.

The modules (M), optionally with cooperation of a joint filler material, with vertical alignment of the longitudinal axis of the shaped bodies (F1), are joined to one another virtually seamlessly in a mosaic-like manner side by side such that they virtually completely cover the cross section of the tray B.

The joins or gaps that can form where the outer side faces of the cassettes that form the modules (M) meet one another or meet the inner face of the lateral boundary W of the apparatus D can preferably be filled with joint filler material. Useful joint filler material of this kind includes: weave, felt, mats or similar composed of high-temperature-resistant inorganic, preferably mineral, material such as silicate, for example mats made of polycrystalline fibers.

In addition, as described above, the volume V of the apparatus D can be filled in various ways partly or completely with modules (M) and/or catalytic and/or noncatalytic shaped bodies (F1) and/or (F2), preferably in the manner of horizontal layers, preferably up to a maximum of the lowermost braid made of precious metal and/or base metal, for example as described hereinafter under a) to c):

a) A lowermost layer of catalytic and/or noncatalytic shaped bodies (F2), and on top of that a layer or multiple layers of catalytic and/or noncatalytic shaped bodies (F1).
   b) A lowermost layer of modules (M) comprising catalytic and/or noncatalytic shaped bodies (F1), and on top of that a layer or multiple layers of catalytic and/or noncatalytic shaped bodies (F2),
   c) A lowermost layer either of modules (M) comprising catalytic and/or noncatalytic shaped bodies (F1) or a lowermost layer of catalytic and/or noncatalytic shaped bodies (F2), and above that in each case, in a regularly alternating or irregularly layered manner, at least one layer of modules (M) comprising catalytic and/or noncatalytic shaped bodies (F1) or of catalytic and/or noncatalytic shaped bodies (F2).

Typically, the layers in the variants described are separated horizontally by apparatuses such as perforated sheets or metal meshes in a horizontal arrangement, for example Megapyr meshes.

In further embodiments of good suitability, the volume of the modules (M) themselves may be filled in various ways partly or completely with catalytic and/or noncatalytic shaped bodies (F1) and/or (F2), preferably in the manner of horizontal layers, for example as described hereinafter under ba) to bc):

ba) A lowermost layer of catalytic and/or noncatalytic shaped bodies (F2), and on top of that a layer or multiple layers of catalytic and/or noncatalytic shaped bodies (F1).
   bb) A lowermost layer of catalytic and/or noncatalytic shaped bodies (F1), and on top of that a layer or multiple layers of catalytic and/or noncatalytic shaped bodies (F2).
   bc) A lowermost layer either of catalytic and/or noncatalytic shaped bodies (F1) or a lowermost layer of catalytic and/or noncatalytic shaped bodies (F2), and above that in each case, in a regularly alternating or irregularly layered manner, at least one layer of catalytic and/or noncatalytic shaped bodies (F1) or of catalytic and/or noncatalytic shaped bodies (F2).

The layers in the variants ba) to bc) described can be horizontally separated by apparatuses such as perforated sheets or metal meshes in a horizontal arrangement, for example Megapyr meshes.

The reactor R may be a vessel for conducting chemical reactions, preferably on an industrial scale.

Examples of chemical reactions of this kind are oxidations of carbonaceous and/or nitrogenous compounds, preferably with oxygenous or halogenous gases. Examples of such oxidations are customary combustion of mineral oil, naphtha, natural gas, coal and the like, for example for generation of heat and/or electrical energy; the catalytic oxidation of ammonia with an oxygenous gas, preferably air or pure oxygen, to give nitrogen oxides; what is called the ammoxidation of organic compounds having methyl groups or of methane with ammonia and oxygen to give nitriles or hydrogen cyanide.

A further example of chemical reactions of this kind is the preferably catalytic conversion of nitrogen oxides, preferably dinitrogen oxide ($N_2O$), to nitrogen and oxygen.

Preferably, the reactor R is a vessel for preparation, preferably on an industrial scale, of chemical products, for example for preparation of nitrogen oxides such as $NO_2$, $N_2O$, $N_2O_4$, NO and/or nitric acid and/or nitrous acid, by methods including catalytic oxidation of ammonia with oxygenous gas, for example air; for preparation of sulfur oxides such as $SO_2$, $SO_3$ and/or sulfuric acid, sulfurous acid or further acids of the sulfur oxides.

For example, the reactor R is a cylindrical vessel for preparation, preferably on an industrial scale, of nitrogen oxides such as $NO_2$, $N_2O$, $N_2O_4$, NO and/or nitric acid and/or nitrous acid by catalytic oxidation of ammonia with an oxygenous gas, for example air or pure oxygen.

The present application further provides for the use of the reactor R with the apparatus D in a process for preparing nitrogen oxides by catalytic oxidation of ammonia, for example in the temperature range from 800 to 900° C. and, for example, over a mesh made of precious metal, such as platinum or platinum-rhodium alloy, with an oxygenous gas, for example air or pure oxygen, and optionally reaction of the nitrogen oxides with water to give nitric acid, it being explicitly pointed out that all disclosure relating to the reactor R and/or to the apparatus D or other subjects of the invention is explicitly incorporated herein into the aforementioned subject matter of the present invention.

The present application further provides a process for preparing nitrogen oxides, wherein, in a reactor R, ammonia is catalytically oxidized with an oxygenous gas, preferably air or pure oxygen, for example in the temperature range from 800 to 900° C., for example over a mesh made of precious metal, such as platinum or platinum-rhodium alloy, and the reaction products comprising nitrogen oxides formed, which generally comprise nitrogen monoxide as the main component and dinitrogen monoxide as a secondary component, are allowed to flow through an arrangement of catalytic and/or noncatalytic shaped bodies (F) in an apparatus D which is typically arranged in the flow direction downstream of the catalyst mesh typically beneath it, wherein the arrangement of the catalytic and/or noncatalytic shaped bodies (F) and the apparatus D is in each case as defined above, and it being explicitly pointed out that all disclosure relating to the catalytic and/or noncatalytic shaped bodies (F), to the apparatus D herein and/or the reactor R or other subjects of the invention is explicitly incorporated herein into the aforementioned subject matter of the present invention.

The present application further provides a process for preparing nitric acid, wherein, in a reactor R, ammonia is catalytically reacted with an oxygenous gas, preferably air or pure oxygen, for example in the temperature range from 800 to 900° C., for example over a mesh made of precious metal, such as platinum or platinum-rhodium alloy, and the reaction products comprising nitrogen oxides formed, which generally comprise nitrogen monoxide as the main component and dinitrogen monoxide as a secondary component, are allowed to flow through an arrangement of catalytic and/or noncatalytic shaped bodies (F) in an apparatus D which is typically arranged in the flow direction downstream of the catalyst mesh, typically beneath it, typically cools down, wherein they react with oxygen to form nitrogen dioxide and react with water to form nitric acid, wherein the arrangement of the catalytic and/or noncatalytic shaped bodies (F), the apparatus D and the reactor R is in each case as defined above, it being explicitly pointed out that all disclosure relating to the catalytic and/or noncatalytic shaped bodies (F), to the apparatus D herein and/or the reactor R or other subjects of the invention is explicitly incorporated herein into the aforementioned subject matter of the present invention.

Working examples are also shown in the figures and are elucidated in detail in the description which follows.

LIST OF REFERENCE NUMERALS RELATING TO THE FIGURES 1 reactor wall
2 joint filler material
3 wall of a module (M)
4 shaped bodies (F1)
5 [EMPTY]
6 module (M)
7 tray of a module (M)
8 braid made of precious metal and/or base metal
9 compensation body
10 tray B of the apparatus D
11 lateral boundary W of the apparatus D
12 U-shaped skirt
13 pipes for cooling medium FIG. 1 shows, in cross section, part of a cylindrical reactor R, preferably for the $NO_x/HNO_3$ embodiment, in which the apparatus D is accommodated. This shows: the reactor wall 1, 11, the lateral boundary W of the apparatus D, the modules 6 encased by the walls 3, where the joins between the modules (M) 6 themselves and between the modules (M) 6 and the reactor wall 1 have been filled with joint filler material 2. The shaped bodies (F1) 4 are present within the modules M. The modules (M) 6 virtually completely cover the cross section of the tray B.

FIG. 2 shows a longitudinal section through a module (M) 6 inter alia. This shows: the wall 3 of a module (M) 6, the tray 7 of a module (M) 6, the tray B 10 on which the modules (M) rest, the shaped bodies (F1) 4 encased in the modules (M), the joint filler material 2, the braid made of precious metal and/or base metal 8. The space between shaped bodies (F1) and braid 8 is filled with a gas- and/or liquid-permeable layer of high-temperature-resistant inorganic material, the compensation body 9.

Figure 3:
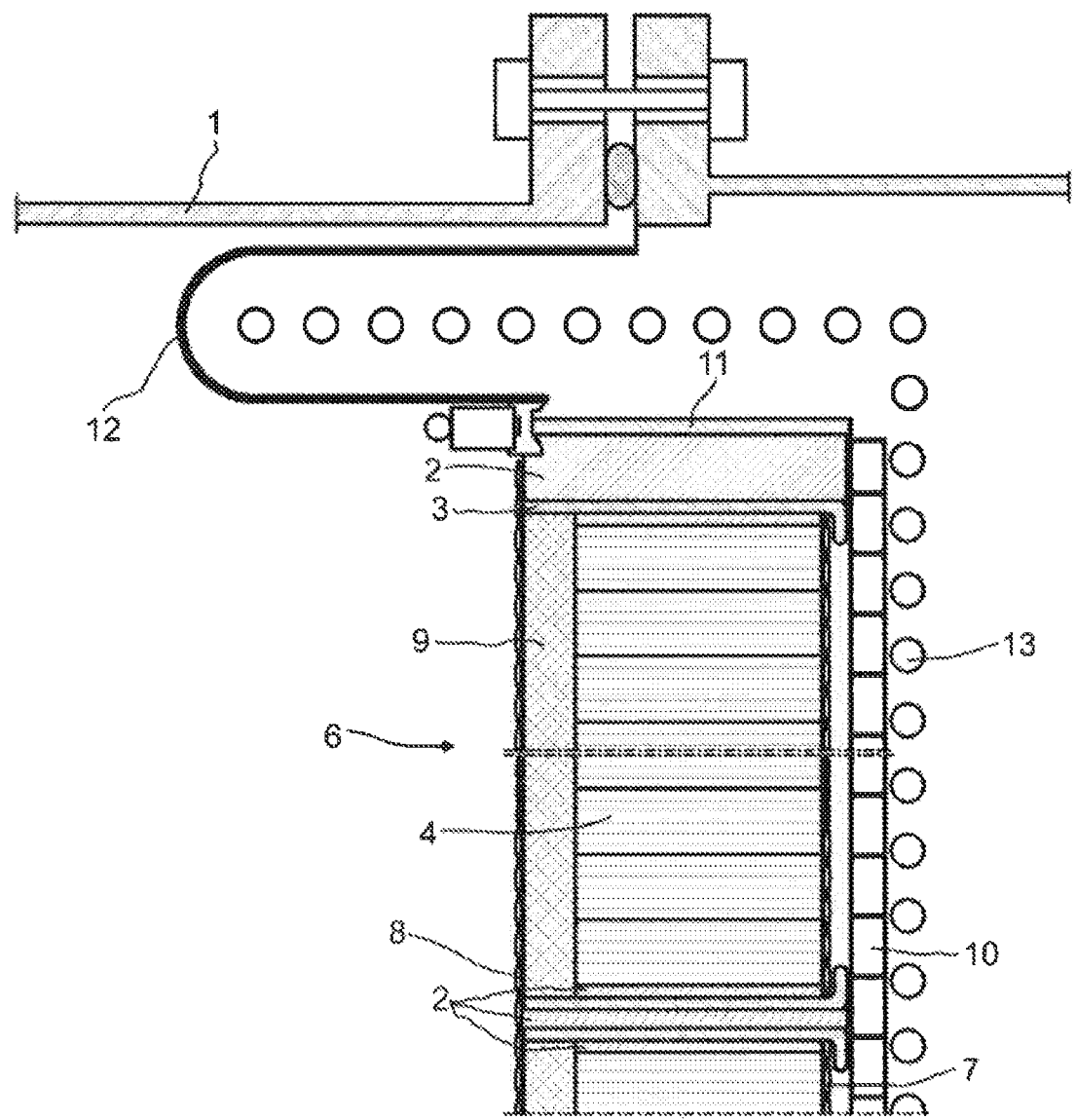

FIG. 3 is analogous to FIG. 2, including the corresponding reference numerals, and shows, in longitudinal section, part of a cylindrical reactor R—preferably for the $NO_x/HNO_3$ embodiment—in which the apparatus D comprising modules (M) 6 is accommodated. A U-shaped skirt 12 made of metal is secured on the reactor wall 1 on one side by flange. On the other side of the U-shaped skirt 12 made of metal is secured the lateral boundary W 11 of the apparatus D. The U-shaped skirt 12 ensheaths some of the tubes for a cooling medium 13.

EXAMPLES

General

An ammonia/air mixture (12.5% by volume of $NH_3$, 87.5% by volume of air) is fed to the cylindrical ammonia combustion furnace (reactor R) in which an apparatus D in the form of a basket with round tray cross section is accommodated. The basketlike apparatus D has a clear diameter of 3.52 m. The reactor R is accommodated with an ammonia/air mixture throughput of 3650 $m^3$ (STP)/h and per $m^2$ of catalyst mesh area. The inlet temperature of the ammonia/air mixture into the reactor R is 28.4° C. and the pressure upstream of the platinum catalyst mesh in the reactor R is 1080 mbar (abs.). The ammonia is combusted over the platinum catalyst mesh at temperatures of about 880° C. to give the reaction product, which is then guided through the apparatus D, comprising a catalytically active charge, and comprises nitrogen monoxide as the main component and small amounts of dinitrogen monoxide $N_2O$ ("laughing gas"). The dinitrogen monoxide concentration of the reaction product directly downstream of the platinum catalyst mesh, i.e. before meeting the catalytically active charge of the basketlike apparatus D, is about 1000 ppm. Downstream of the platinum mesh is the basketlike apparatus D comprising catalytic shaped bodies (F1) (inventive) or catalytic shaped bodies (F2) (noninventive), as described in detail below.

The non-meshlike parts of the basketlike apparatus D consist of Inconel 600; the lateral boundary W is about 250 mm high.

Samples of the reaction product can be taken directly downstream of the platinum catalyst mesh (withdrawal point 1) and in the middle of the reactor R, directly beneath the tray B of the apparatus D in downstream direction (withdrawal point 2), and also at the periphery of the reactor downstream, directly beneath the lower edge region of the tray B of the apparatus D (withdrawal point 3), and they can be analyzed for dinitrogen monoxide concentration by means of the GC/MS method.

After an operating time of nine months of the reactor R, the apparatus D and its charge are examined. Dinitrogen monoxide concentrations are measured during the operation of the reactor R.

Comparative Example 1 (Noninventive)

The basketlike apparatus D with round tray cross section initially comprises, virtually over the whole area, a layer of catalytic shaped bodies (F2) of height 150 mm, namely unsupported catalyst strands, where these strands have a star-shaped cross section, a diameter of about 6 mm and a length of 5 to 30 mm, and consist of a mixture of CuO, ZnO and $Al_2O_3$.

In a continuous process, an ammonia/air mixture is converted as described above.

The edge region of the apparatus D has a funnel-shaped depression in the form of a trench of depth 96 mm in the catalytically active filling, the height of which in the edge region of the apparatus D is only 54 mm (150 mm before commencement of the experiment).

The dinitrogen monoxide concentration measured at the withdrawal point 3 virtually below the funnel-shaped depression is 676 ppm of dinitrogen monoxide, the dinitrogen monoxide concentration measured at the withdrawal point 2 is 186 ppm, and so the averaged dinitrogen monoxide concentration measured downstream of the apparatus D and the heat exchanger downstream thereof is 227 ppm.

Example 1 (Inventive)

The basketlike apparatus D with round tray cross section comprises, virtually over the whole area, metal cassettes as described hereinafter and shown in an analogous manner in FIG. 1. 16 metal cassettes are used, which consist of square shapes with outer dimensions of 800×800 mm and consist of shapes matched to the cylindrical lateral boundary of the apparatus D or the reactor R. The cassettes have been sealed to one another and toward the cylindrical lateral boundary with joint filler material. The cassettes have been filled with inventive catalytic shaped bodies (F1) in the form of a regular hexagonal prism or fragments thereof, as shown in FIG. 1, These catalytic shaped bodies (F1) are what are called unsupported catalysts and consist essentially of a mixture of CuO, ZnO and $Al_2O_3$. They have a height of 160 mm.

In a continuous process, an ammonia/air mixture is converted as described above.

The dinitrogen monoxide concentration measured at the withdrawal point 3 in the outer region of the apparatus D where the funnel-shaped depression was in the noninventive case is 84 ppm of dinitrogen monoxide, the dinitrogen monoxide concentration measured at the withdrawal point 2 is 81 ppm, and so the averaged dinitrogen oxide concentration measured downstream of the apparatus D and the heat exchanger downstream thereof is 82 ppm.

The invention claimed is:

1. A reactor R with apparatus D, the latter comprising a gas- and/or liquid-permeable tray B, in the edge region of which there is disposed a lateral boundary W which fully encloses the tray B and forms a volume V comprising catalytic and/or noncatalytic shaped bodies (F), wherein there is at least one braid made of precious metal and/or base metal on an upstream side opposite the tray B, and the catalytic and/or noncatalytic shaped bodies (F) are selected from (i) shaped bodies (F1) in the form of straight prisms, the footprint of which is selected from triangle, rectangle, hexagon or fragments of these polygons, and (ii) a combination of the shaped bodies (F1) with shaped bodies (F2) that are smaller than the shaped bodies (F1), wherein groups of m to n shaped bodies (F1), m and n being an integer from 3 to 30 with n>m, are framed in a metal cassette open in the upstream direction and closed in the downstream direction by a gas-permeable tray, with side face to side face and with their longitudinal axis aligned in vertical direction, covering the cross section of the tray, to form modules (M), and the modules (M), optionally with cooperation of a joint filler material, with vertical alignment of the longitudinal axis of the shaped bodies (F1), are joined to one another in a mosaic-like manner such that they cover the cross section of the tray B.

2. The reactor R with apparatus D according to claim 1, wherein there is a thermally insulating layer S at least over part of the area of the inside of the lateral boundary W of the apparatus D, and the material for the thermally insulating layer S is selected from the group consisting of ceramic material, microporous material and silicate fibers.

3. The reactor R with apparatus D according to claim 1, wherein the cross section of the reactor Rand of the tray B is round in each case.

4. The reactor R with apparatus D according to claim 1, wherein the volume V of the apparatus D has been filled with catalytic and/or noncatalytic shaped bodies (F) up to a maximum of the lowermost braid made of precious metal and/or base metal.

5. A process comprising preparing nitrogen oxides by catalytic oxidation of ammonia in the reactor R of claim 1 and optionally reacting of the nitrogen oxides with water to give nitric acid.

6. A process for preparing nitrogen oxides, wherein, in the reactor R of claim 1, ammonia is catalytically oxidized with an oxygenous gas and the reaction products which comprise nitrogen oxides and are thus formed are allowed to flow through an arrangement of catalytic and/or noncatalytic shaped bodies (F) in an apparatus D, wherein the arrangement of the catalytic and/or noncatalytic shaped bodies (F) and the apparatus D are as defined in claim 1.

7. A process for preparing nitric acid, wherein, in a reactor R, ammonia is catalytically oxidized with an oxygenous gas and the reaction products which comprise nitrogen oxides and are thus formed are allowed to flow through an arrangement of catalytic and/or noncatalytic shaped bodies (F) in an apparatus D and then reacted with water to give nitric acid, wherein the arrangement of the catalytic and/or noncatalytic shaped bodies (F) and the apparatus D are as defined in claim 1.

* * * * *